3,317,485
INTERPOLYMERS OF N-VINYLACETAMIDES WITH MALEIC ANHYDRIDE

Robert B. Blance, East Longmeadow, and Saul M. Cohen, Springfield, Mass., assignors, by mesne assignments, to Monsanto Company, a corporation of Delaware
No Drawing. Filed July 16, 1963, Ser. No. 295,528
2 Claims. (Cl. 260—78.5)

This invention relates to the interpolymerization of N-vinylacetamides with other polymerizable ethylenically unsaturated compounds; more particularly, it relates to the interpolymerization of N-substituted N-vinylacetamides in which the substituent is an aromatic hydrocarbon radical or an aliphatic hydrocarbon radical having at least two carbon atoms.

The polymerization of certain vinyl monomers containing tertiary nitrogen has been disclosed in U.S. Patent 2,231,905. That patent affords, for example, satisfactory preparations of homopolymers of N-vinylimides of dicarboxylic acids and of interpolymers of these imides with other ethylenically unsaturated monomers of the vinyl, acrylic and chloroprene types. In contrast, the state of the art with respect to polymers of N-vinyl tertiary amides is much less satisfactory. On the one hand, the difficulties encountered in attempts to homopolymerize the N-vinyl tertiary amides of monocarboxylic acids have led so far only to the production of dark-colored oligomeric oils. Similarly, attempts to interpolymerize these amides with other ethylenically unsaturated monomers have resulted merely in the production of uncharacterized materials of dubious value and that by processes and under conditions which have been qualified as drastic.

It is therefore an object of this invention to provide solid high molecular weight interpolymers of N-hydrocarbon substituted N-vinylacetamides with other ethylenically unsaturated materials. A further object is to establish the conditions under which said interpolymers may be prepared. Other objects will become apparent hereinafter.

These objects have been accomplished by subjecting to the influence of a non-oxidizing free radical polymerization initiator of the α,α′-azo-diisobutyronitrile type, mixtures of monomers consisting of a compound of the general formula

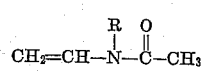

in which R is selected from the class consisting of alkyl groups having from 2 to about 18 carbon atoms and aryl groups having from 6 to about 15 carbon atoms, and at least one other ethylenically unsaturated compound. The polymerization is carried out at temperatures within the range of 0° to about 100° C. and the mixture may contain an organic solvent or a buffered aqueous system. The preparation of these interpolymers in this manner is rather surprising in view of the unsatisfactory behavior of the N-vinylacetamides in the preparations heretofore available.

The invention is further illustrated but not limited by the following examples.

Example 1

N-propyl-N-vinylacetamide (5.7 g., 0.045 mole), vinyl acetate (0.43 g., 0.005 mole) and α,α′-azo-diisobutyronitrile (0.066 g., 0.78 mole percent) were placed in a 4-oz. screwcap bottle. The bottle was flushed with nitrogen and sealed. It was kept in a 50° C. water-bath for 24 hours. During this period, the content of the bottle set to a solid mass. The mass was dissolved in acetone and mixed with six volumes of hexane to precipitate the polymer. The polymer was redissolved and reprecipitated in the same manner. The white polymer mass was then shredded and dried at 45° C. and 30 mm. Hg for four hours. The polymer, 5.07 g. or 83% conversion, had an intrinsic viscosity in benzene at 20° C. of 1.00 dl./g. It softened at 145° C. and flowed at 215° to 230° C. It was soluble in water, acetone and benzene, but not in hexane. Its polyvinyl acetate content was 10.5 mole percent.

The intrinsic viscosity is a function of the molecular weight of a polymer and serves as a useful and convenient indicator of molecular weight. The value is obtained by conventional method, i.e. by measuring at 20° C. the relative viscosities of a series of solutions in the concentration range of 0.1 to 1 g. of polymer per 100 ml. of solvent. N-vinylacetamide interpolymers with intrinsic viscosities of at least 0.04 dl./g. meet the minimum molecular weight requirement that should be possessed in order to have useful properties as, for example, the resin component of adhesive and hair-spray formulations.

Example 2

The copolymerization of Example 1 was repeated on a larger scale with the monomers present in a 1:1 mole ratio. The weights of reactants were 95.3 g. N-propyl-N-vinylacetamide (0.75 mole), 64.5 g. vinyl acetate (0.75 mole) and 1.98 g. α,α′-azo-diisobutyronitrile (0.78 mole percent). The weight of the interpolymer recovered was 134.8 g. corresponding to an 84% conversion. The white polymer was soluble in acetone and benzene but not in water and hexane. It had an intrinsic viscosity of 0.42 dl./g. in benzene at 20° C. The polymer contained 46.1% by weight of polyvinyl acetate; this corresponds to a mole fraction of 56%.

Example 3

N-vinylacetanilide (5 g.), vinyl acetate (10 g.) and α,α′-azo-diisobutyronitrile (0.15 g.) were placed in a 4-oz. screwcap bottle. The bottle was flushed with nitrogen, sealed and placed in a waterbath at 50° C. for 48 hours. An additional 0.2 g. of the catalyst was added during this period. The polymer was dissolved in acetone, precipitated with hexane and washed with warm hexane (50° C.). The white powder thus obtained weighed 1.2 g., had and intrinsic viscosity of 0.4 dl./g. in benzene at 20° C. and an acetate content of 26.7% by weight, calculated as polyvinyl acetate.

Example 4

A solution of 1 g. of the poly [(N-propyl-N-vinylacetamide)-co-(vinyl acetate)] of Example 2 in 30 ml. pyridine and 20 ml. methyl alcohol was refluxed gently for 1.5 hours in the presence of 25 ml. of 0.5 N potassium hydroxide. It was then neutralized with 0.5 N hydrochloric acid. The residue obtained on evaporation was taken up in water and precipitated by warming the resulting solution. It was redissolved in water once more and reprecipitated by adding sodium sulfate and heating. The precipitate was extracted with methanol and the methanol extract was filtered and evaporated to yield the hydrolyzed copolymer. The resulting poly [(N-propyl-N-vinylacetamide)-co-(vinyl alcohol)] was a tough and flexible material. It gave very viscous solutions in water which did not cloud at temperatures below 100° C.

Example 5

N-propyl-N-vinylacetamide (5.7 g., 0.045 mole), maleic anhydride (0.49 g., 0.005 mole) and α,α′-azo-diisobutyronitrile (0.066 g.) were added to 5 ml. benzene in a 4-oz. screwcap bottle. The bottle was flushed with nitrogen, sealed and maintained at 50° C. for 40 hours. The contents were then dissolved in acetone and hexane was added to precipitate the polymer. The polymer was washed with hexane and dried. A 21 percent conversion of the monomers had taken place to yield 1.27 g. of copolymer having an intrinsic viscosity of 0.08 dl./g. in acetone at 20° C. The polymer softened at 208° C. but did not melt; at 280° C. it was a dark brown semi-coherent mass. The polymer was soluble in dilute ammonium hydroxide, hot hydrochloric acid, methanol, ethanol, pyridine, acetone and ethylene dichloride. It was partly soluble in benzene and insoluble in water.

*Example 6*

N-propyl-N-vinylacetamide (5.7 g., 0.045 mole) was added to the usual bottle containing 0.066 g. $\alpha,\alpha'$-azo-diisobutyronitrile and 1 ml. concentrated ammonium hydroxide dissolved in 6 ml. t-butyl alcohol. The bottle was flushed with nitrogen. Acrylic acid (0.35 g., 0.005 mole) was added. The bottle was sealed, agitated to ensure complete mixing of the contents and placed in a constant temperature bath at 50° C. for 21 hours. Some polymeric material precipitated within one hour. The contents of the bottle were dissolved in water and the aqueous solution was heated to remove the t-butyl alcohol and unreacted amide by steam distillation. The aqueous solution was then acidified with a few drops of dilute hydrochloric acid thus causing a white polymeric material to precipitate. This was washed with water and extracted with acetone, leaving an insoluble residue which weighed 1.26 g. The acetone extract was evaporated and yielded 2.6 g. of poly(N-propyl-N-vinylacetamide).

The intrinsic viscosity of the residue in dimethylacetamide at 20° C. was 1.61. The polymer softened at 190° C.; it darkened and became degraded between 275° and 290° C. It was soluble in dilute ammonium hydroxide, pyridine and dimethylacetamide. It was insoluble in water, hydrochloric acid, acetic acid, methanol and acetone.

*Example 7*

The copolymerization of N-lauryl-N-vinylacetamide (5.0 g.) and vinyl acetate (15.0 g.), initiated with $\alpha,\alpha'$-azo-dibutyronitrile (0.5 g.), at 60° C. for 48 hours followed by the recovery of the product by precipitation from acetone and hexane in the manner of Example 1, yielded 16.5 g. of a copolymer with an intrinsic viscosity of 0.13 in methanol at 20° C.

The polymers of this invention are solid materials having a minimum molecular weight of 5000 which, as mentioned earlier, corresponds to an intrinsic viscosity of at least 0.04 dl./g., the preferred products being those with an intrinsic viscosity within the range of 0.1 to about 1.0 dl./g. They consist of units of N-hydrocarbon substituted N-vinylacetamides in which the substituent is selected from the class of aliphatic hydrocarbon radicals containing from 2 to about 18 carbon atoms and aromatic hydrocarbon radicals containing from 6 to about 15 carbon atoms, copolymerized with units of at least one other polymerizable ethylenically unsaturated compound.

Typical hydrocarbon substituents of the N-vinylacetamides include the ethyl, propyl, lauryl, cyclohexyl, phenyl, naphthyl and octylphenyl groups.

Among the materials that may be copolymerized with the N-vinylacetamides are: the vinyl ester, including vinyl acetate, vinyl propionate, vinyl butyrate, vinyl hexoate, vinyl benzoate and so on; acrylic compounds, such as acrylic acid, methacrylic acid and the lower alkyl esters of these acids including the methyl and ethyl esters; hydrocarbons such as ethylene and styrene; polycarboxylic vinyl type compounds such as maleic and fumaric anhydride and their lower alkyl esters and nitriles; vinyl chloride and so on.

The physical properties of the copolymers vary naturally with, among other factors, the nature of the comonomer that is polymerized with the N-vinylacetamide and the molecular weight of the copolymer. The type of solubility possessed by particular combinations of monomers is disclosed in the examples. An idea of the possibilities is afforded by the copolymers of N-vinyl-N-propylacetamide and vinyl acetate which are soluble in cold water when their vinyl acetate unit content is about 10 mole percent and are not soluble but are still water-sensitive at a vinyl acetate unit content of 50 mole percent. These properties may be further drastically changed by hydrolysis of the ester groups of the copolymer, as demonstrated in Example 4. Compatibility of the copolymer with such plasticizers as nonylphenol and with resins such as epoxies, polyvinyl alcohol and poly(N-vinylpyrrolidone) is also affected by the same factors.

The polymerization process can be carried out in bulk, in organic solvent solutions and in buffered aqueous emulsion. A temperature within the range of 0° to about 100° C. will generally suffice although the best results with favored catalysts have been obtained within the range of 45° to 70° C. These catalysts belong to the general class of non-oxidizing free radical initiators such as $\alpha,\alpha'$-azo-diisobutyronitrile. It is undesirable to use organic peroxides with N-vinylacetamides because of their tendency to cause the cleavage of the acetamide group of the monomers, a phenomenon which leads to low molecular weights and impure products. Similarly, cationic polymerization with iodine and with boron trifluoride at low temperatures produces undesirably low molecular weight copolymers.

Solutions of the interpolymers of this invention in organic solvents such as benzene, acetone, etc. provide excellent adhesives which form good bonds to materials as varied as nylon, polyethylene terephthalate, cellophane, cellulose acetate, polystyrene, polyvinyl chloride, polyvinyl acetate, polymethyl methacrylate, aluminum, copper and so on. In order to achieve such adhesion, the interpolymer may have to be plasticized or the film applied to the adherend may have to be reactivated with such liquids as water and methanol. For instance, when properly plasticized with materials such as the polychlorinated polyphenyls, available commercially under the trademark "Aroclor," they constitute excellent hot melt adhesives for polyvinyl chloride sheeting and leather. Excellent affinity to protein, e.g. wool and hair, recommends them for the formulation of shampoos, wave-set and sprays. Their complexing ability due to the presence of the amide group may lead to application as detoxification agents for phenols and iodine in pharmaceutical products. These complexing properties also suggest exploitation in textiles for sizing, finishing and dyeing. They may be used as protective colloids. Other uses for these materials will readily be imagined by those skilled in the art.

What is claimed is:

1. Copolymers of N-alkyl-N-vinylacetamide and maleic anhydride having an intrinsic viscosity of at least 0.04 dl./g. in acetone at 20° C., wherein the alkyl group contains from 2 to 18 carbon atoms.

2. A copolymer as in claim 1 wherein the alkyl group is propyl.

References Cited by the Examiner

UNITED STATES PATENTS

| | | | |
|---|---|---|---|
| 2,231,905 | 2/1941 | Hanford | 260—89.7 |
| 3,004,958 | 10/1961 | Berens et al. | 260—78.5 XR |
| 3,186,972 | 6/1965 | Lang et al. | 260—78.5 XR |
| 3,212,972 | 10/1965 | Bailey | 267—87.1 |

FOREIGN PATENTS

| | | |
|---|---|---|
| 621,116 | 8/1962 | Belgium. |
| 1,151,940 | 7/1963 | Germany. |

JOSEPH L. SCHOFER, *Primary Examiner.*

J. A. SEIDLECK, L. G. CHILDERS, L. WOLF, *Assistant Examiners.*